(No Model.) 5 Sheets—Sheet 1.
R. A. SLOAN & J. E. L. BARNES.
APPARATUS FOR SEALING CANS, &c.
No. 502,019. Patented July 25, 1893.
Fig. I.
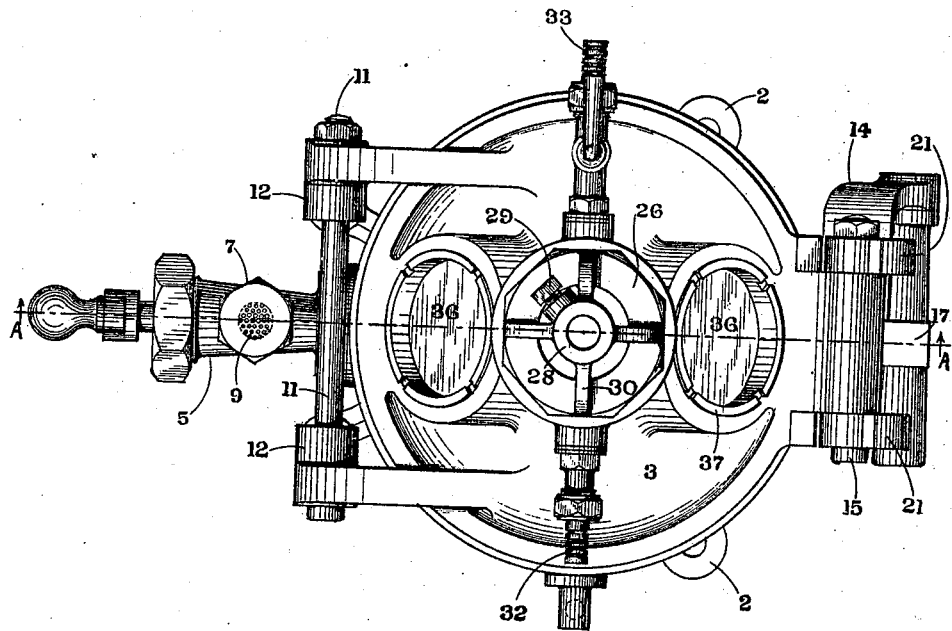

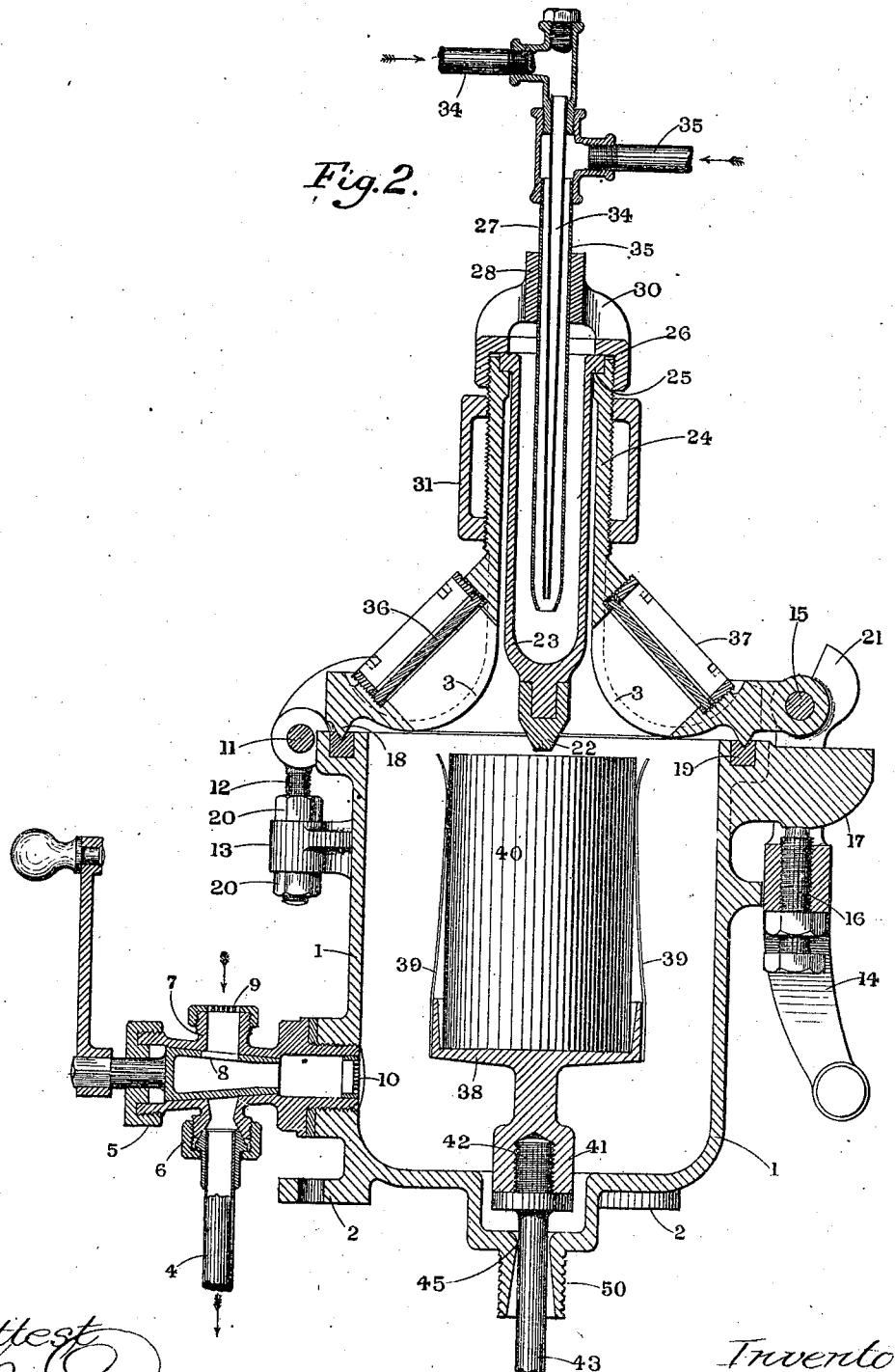

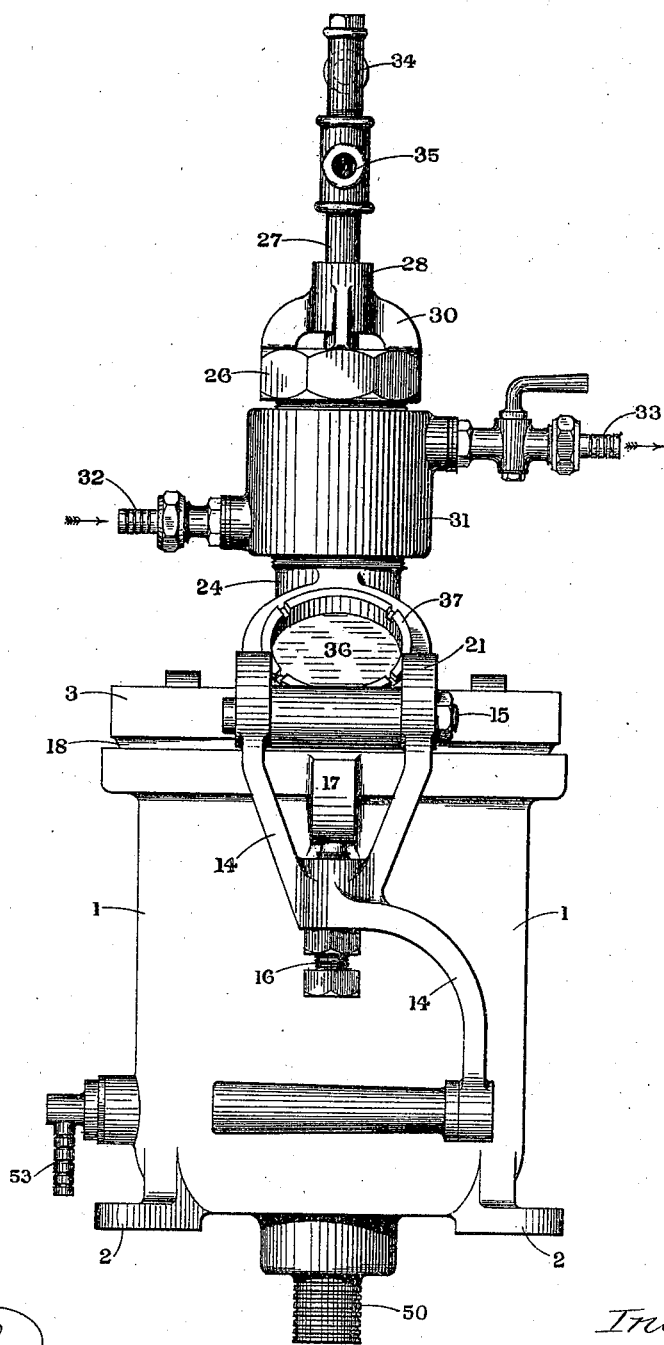

(No Model.)
5 Sheets—Sheet 4.
R. A. SLOAN & J. E. L. BARNES.
APPARATUS FOR SEALING CANS, &c.
No. 502,019.
Patented July 25, 1893.
Fig. IV.
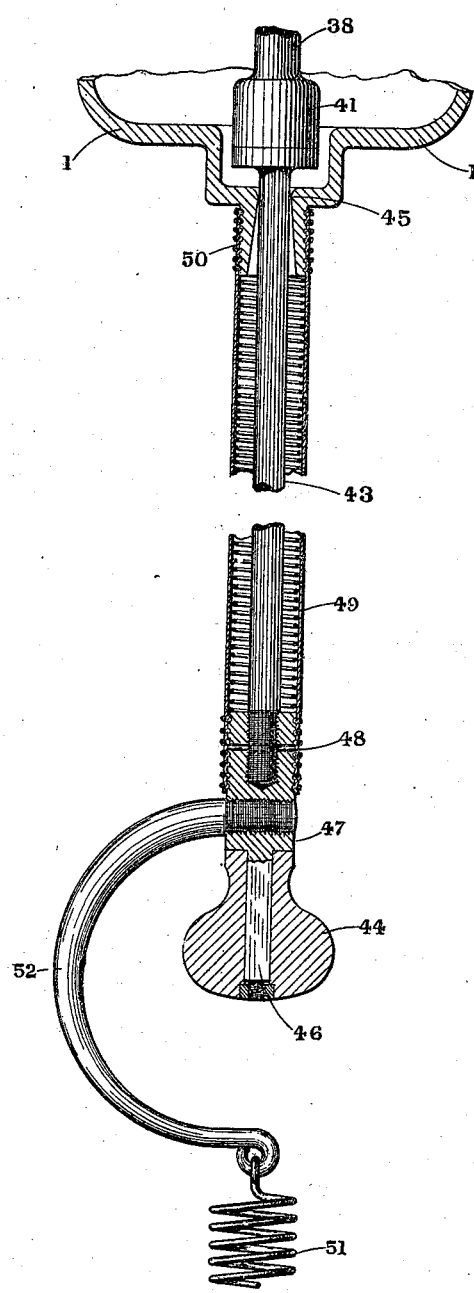

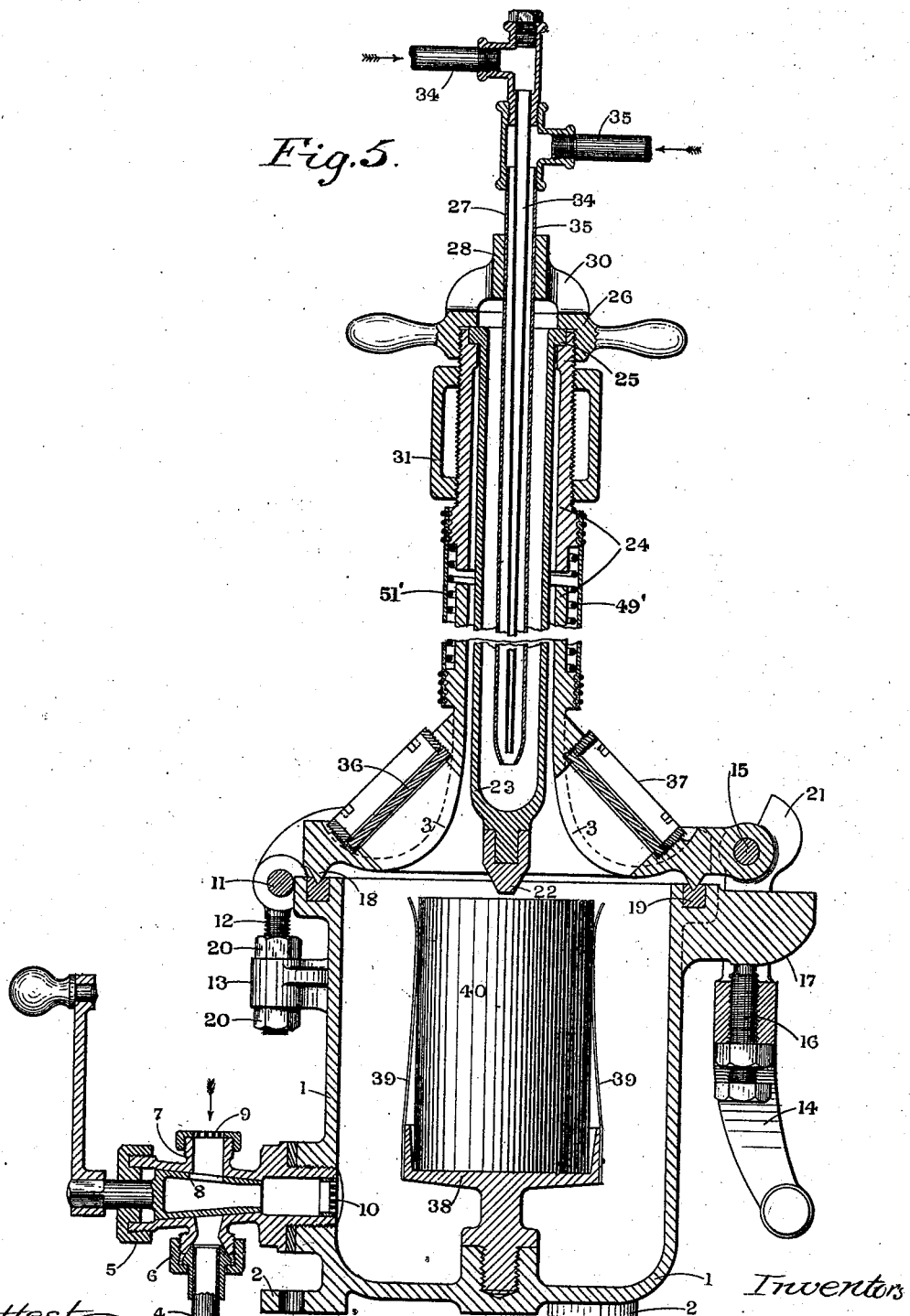

UNITED STATES PATENT OFFICE.

ROBERT A. SLOAN AND JOHN EDWARD LLOYD BARNES, OF BIRKENHEAD, ENGLAND.

APPARATUS FOR SEALING CANS, &c.

SPECIFICATION forming part of Letters Patent No. 502,019, dated July 25, 1893.

Application filed December 1, 1892. Serial No. 453,776. (No model.)

*To all whom it may concern:*

Be it known that we, ROBERT ALEXANDER SLOAN and JOHN EDWARD LLOYD BARNES, both subjects of the Queen of Great Britain, and both residing at Birkenhead, in the county of Chester, England, have invented certain new and useful Improvements in Apparatus for Sealing Cans or other Containing-Vessels, of which the following is a specification.

Our invention relates to apparatus for sealing cans or other containing vessels under a vacuum or a pressure greater or less than that of the atmosphere, or in the presence of a gas other than air. The cans or the like after being filled are completely sealed up, with the exception of a small puncture, before being operated upon by our present apparatus, and the object of the latter is to seal the said puncture under the conditions stated. We place the can in a holder within a receiver which can be readily closed air-tight and which can be wholly or partially exhausted or filled with air or other gas at any desired pressure, and we effect the sealing by means of a soldering bit or the like charged with molten solder or other sealing material and heated from without, either by a gas flame or a hot bar of iron or electrically, either the can or the bit being movable by a handle which passes air-tight through the receiver, so that the bit can be applied to the exact spot desired.

In the accompanying drawings which illustrate our invention as applied to sealing cans by soldering under a vacuum, Figure I is a plan; Fig. II, a sectional elevation on the line A, A, of Fig. I. Fig. III is a front elevation, and Fig. IV is a sectional elevation of a detail. Fig. V is a view representing a modified construction.

Throughout the drawings the same parts are indicated by the same reference figures, and in the case of Fig. II, the direction in which the section is viewed is indicated by the small arrows adjacent to the letters denoting the plane of section.

1 is a receiver of suitable size and form to receive the largest can to be sealed; it is firmly bolted down by the feet 2 and closed above by the cover 3 and it communicates with an exhausting pump by the pipe 4 and cock 5. The cock 5 has two opposite branches 6 and 7 and a single port 8 in its plug, so that the interior of the receiver can be placed at will either in communication with the pump or the atmosphere; the object of the perforated plates 9 and 10 is to prevent dirt being drawn into the apparatus or the pump by the rush of air.

The cover 3 is hinged at the back of the receiver on the bar 11 carried by the eyebolts 12 which are in turn carried by the brackets 13 cast on the receiver; the forked hand lever 14 is pivoted to the front of the cover by the bolt 15 and it is fitted with the adjustable set screw 16 adapted to bear underneath the rigid cam surface 17 cast on the receiver. The joint between the cover and the receiver is made by the V rim 18 which abuts on the rubber ring 19 embedded in a groove in the top of the receiver; by adjusting the screw 16 and the nuts 20 on the eyebolts 12, (which pass through clearance holes in the brackets 13,) the height of the cover relatively to the receiver can be regulated at three points with precision and a proper and equable pressure between the V rim and the rubber ring thus insured; this adjustment having once been made, it will require no further attention except to take up wear. The hand lever has a pair of stops 21 so that when the lever is swung outward clear of the cam surface 17, so freeing the cover, the stops abut against the latter and the lever then serves to swing the cover back on its hinge so as to give free access to the receiver. The arrangement shown allows the cover to be opened and closed air-tight with great facility and this is essential as this has to be done each time a can is sealed.

The soldering bit 22 by which the sealing is effected is within the receiver but is heated by conduction from without; this bit, which requires to be occasionally renewed, is detachably secured to the closed lower end of the open topped tube 23 which is preferably of copper on account of its high conductivity for heat. The tube 23 passes up the tubular portion 24 of the cover and has a flange 25 at its top which sits in a corresponding recessed seating in 24, and an air-tight joint is made by inserting an asbestos washer between the flange 25 and its seating and screwing down the union nut 26. The copper tube is continuously heated internally by the blow pipe 27 constructed in the usual manner of an inner tube 34 and an outer tube 35; as the combustion takes place in a confined space we find it preferable to bring the gas supply through the inner tube and the air blast through the outer tube. The blow pipe is held at any desired height in the boss 28 by the pinching screw 29; this boss is cast integral with the nut 26 and is supported by the arms 30 which allow free escape for the products of combustion. The height of the blow pipe is adjusted so as to bring the hottest part of the flame to bear upon the center of the bottom of the tube 23 and as this tube, as well as the soldering bit 22, are both of copper, sufficient heat is conducted to the point of the latter to melt the solder. The blow pipe is omitted, for the sake of clearness, from Fig. I.

It is necessary to prevent, as far as possible, the conduction of heat to the other parts of the apparatus, and with this object the tube 23 is made tall so that the heat may have to travel a considerable distance before reaching the air-tight joint at the flange 25; the water casing 31 surrounding the part 24 of the cover arrests any flow of heat down the latter and keeps the lower part of the apparatus cool; a constant flow of water enters the casing by the inlet 32 and leaves by the outlet 33. To prevent radiation of heat from the tube 23, the annular space between it and 24 may be packed with asbestos. The tubular connections to the gas inlet 34, blast inlet 35, water inlet 32 and water outlet 33 are all made of rubber tubing to permit of the necessary movement of the cover in opening and closing the receiver.

36 are circular glass windows, fixed air-tight in the cover by rubber washers and screwed rings 37, through which the sealing operation can be observed.

38 is a holder having spring arms 39 between which the can 40 to be sealed is pushed and held with gentle friction. This holder must be adapted to the size and form of the can so as to hold it with its puncture close below the point of the soldering bit 22; in order that the apparatus may be adapted to operate upon cans of different sizes and forms, a series of corresponding holders are provided, each of which has a tapped boss 41 adapted to screw freely, after the manner of a lathe chuck, on to the screwed nose 42 of the handle bar 43.

In order to effect the sealing, the top of the can must be to a small extent movable horizontally in any direction and also vertically and this is effected by the handle bar 43 and knob 44 which are shown in Fig. IV; the handle bar passes quite freely through the hole 45 in the bottom of the receiver which serves as a fulcrum so far as horizontal movement is concerned and also permits of the necessary vertical sliding. The handle bar passes through a hole in the bench upon which the apparatus rests and is carried down sufficiently to bring the knob 44 into a convenient position for the operator; the knob is secured to the square stem 46 on the cylindrical piece 47 into which the lower end of the handle bar is screwed and pinned by the pin 48. In order to prevent leakage at the hole 45, the handle bar is surrounded by the internally wired rubber tube 49 which is tightly lashed above to the tubular prolongation 50 on the receiver and below to the piece 47. This tube possesses sufficient elasticity to accommodate itself to the slight movement of the handle bar. As the pressure of the atmosphere acting on the area of the cross-section of the tube 49 will tend to force the handle bar into the apparatus, we counteract this tendency by the spiral spring 51 which may be attached below to the floor and is connected, under sufficient tension, to the handle bar by the bow 52 which is screwed into the piece 47 above the knob 44 so as not to impede the use of the latter.

The action of the apparatus is as follows:— The blow pipe having been lit for a few minutes to heat the bit, the latter is charged with molten solder, the appropriate holder is screwed on to the nose 42, and the can, already filled, closed and punctured as desired, is pushed into the holder and the vicinity of the puncture is moistened with soldering fluid or sprinkled with powdered resin. The cover is now closed and the cock 5 turned on to the exhausting pipe 4 which should preferably lead from a reservoir of considerable volume. As soon as the desired degree of exhaustion within the receiver is attained,— which is indicated by a vacuum gage connected to the receiver by the nozzle 53,—the knob 44 is operated so as to bring the puncture up to the bit 22 and so completely seal the can, after which the cock is turned through half a revolution so as to break the vacuum and the cover may then be opened and the can removed.

It is clear that the apparatus can be used for sealing with cement instead of solder; or, if the containing vessel 40 be made of some readily fusible material, it might be sealed by fusing the material at the puncture and so closing the latter. It is also clear that the apparatus can be used for sealing vessels under a pressure greater than that of the atmosphere (in which case the pipe 4 must lead from a compression pump); or for sealing vessels in presence of a gas other than air, in which case the said gas must be led into the receiver through an inlet controlled by a stop cock.

While we have described the bit 22 as stationary and the can holder 39 as movable, the apparatus might obviously be modified as shown in Fig. 5 in which the can holder 38 is fixed and the tube 23, soldering bit 22 and the means for heating it are made movable, the joint between the moving part and the cover of the receiver being made after the manner described with reference to the movable can holder.

49' is the flexible tube which connects the upper part of the tubular portion 24 of the cover (which is now separate from the cover) to the lower part thereof.

The spring 51' (which is under compression) serves to counterbalance the atmospheric pressure tending to force the soldering bit into the receiver and prevents the lateral collapse of the tube 49'.

We have found that an iron heater placed in the tube 23 (the boss 28 and arms 30 being then dispensed with) answers very well, but the necessity to frequently change the heaters makes such an arrangement much less convenient than that with the blow pipe for continuous work.

In cases where electrical energy is available the soldering bit may be heated by any of the well known methods for electrically heating soldering bits.

We claim—

1. In an apparatus for sealing cans, and in combination, a receiver having an opening in communication with means for controlling the interior pressure, a can holder, an air tight cover, a soldering iron arranged to project into the receiver and devices for heating the said iron, and means for changing the relative horizontal and vertical positions of the can and iron, substantially as described.

2. In apparatus for sealing cans and the like; in combination, a receiver having a cover adapted to readily close it air-tight and having an opening controlled by a cock through which the receiver communicates either with the atmosphere or a pump as may be desired, a soldering bit projecting within the receiver and heated while in position from without the receiver and carried by the cover of the receiver so that when the latter is opened the soldering bit is moved out of the way of the cans, and a handle entering the receiver by a flexible air-tight connection whereby relative movement can be produced between a can held in the receiver and the said soldering bit;—substantially as described.

3. In apparatus for sealing cans and the like; in combination, a receiver having a cover adapted to readily close it air-tight and having an opening controlled by a cock through which the receiver communicates either with the atmosphere or a pump as may be desired, a soldering bit carried by a tube 23 from a tubular portion 24 of the said cover, which said tubular portion 24 is surrounded by a water casing to prevent conduction of heat from the soldering bit to the receiver, and a handle entering the receiver by a flexible air-tight connection whereby relative movement can be produced between a can held within the receiver and the said soldering bit;—substantially as described.

4. In apparatus for sealing cans and the like; in combination with the receiver, the cover 3, hinged by the pin 11 and eyebolts 12, the fastening and lifting lever 14, the cam surface 17, and the tube 23 supported by the said cover and carrying the soldering bit 22;—substantially as described.

5. In apparatus for sealing cans and the like; in combination with the receiver, the cover 3, having a V rim 18 adapted to bear on the rubber ring 19 for making an air-tight joint, the hand lever 14, the set screw 16 therein, the cam surface 17, the stops 21 on the hand lever, whereby the latter serves both to fasten and to lift the cover, the pin 11, the eye-bolts 12, and the nuts 20 whereby in conjunction with the set screw 16, the pressure of the cover on the rubber ring can be accurately adjusted; substantially as described.

6. In combination with the receiver, the device for heating the soldering bit 22 from without the receiver, consisting of the tube 23 to which the bit is detachably secured and which is jointed above to the cover, the blow-pipe 27, and the coupling nut 26 having the boss 28 for carrying the blow-pipe; substantially as described.

7. In combination with the receiver, the device for moving the can 40, consisting of the handle 43 fulcrumed and sliding at 45, and the rubber tube 49 secured above to the tubular prolongation 50 and below to the piece 47; substantially as described.

8. The combination with the receiver 1 of the handle 43 passing into the receiver through a flexible air-tight connection and the can holder 38 adapted to be detachably secured to the said handle; substantially as described.

9. The combination with the receiver, of the handle 43, the can holder secured thereto the spring 51 for balancing the pressure tending to force the handle 43 into the receiver, and the bow 52 which connects the said spring to the said handle without interfering with the use of the knob 44; substantially as described.

In testimony whereof we have hereunto set our hands in the presence of two subscribing witnesses.

ROBERT A. SLOAN.
JOHN EDWARD LLOYD BARNES.

Witnesses:
CHARLES COLLINS,
20 *Castle St., Liverpool, Solicitor Notary.*
WILLIAM I. COX,
*His Clerk, 26 Castle St., Liverpool.*